United States Patent [19]
Tatham et al.

[11] Patent Number: 5,990,443
[45] Date of Patent: Nov. 23, 1999

[54] PLASMA TORCH PILOT ARC CIRCUIT

[75] Inventors: David A. Tatham, Enfield; James M. Gregorich, Merrimack; David M. Morris, Claremont, all of N.H.

[73] Assignee: Thermal Dynamics Corporation, West Lebanon, N.H.

[21] Appl. No.: 09/041,202

[22] Filed: Mar. 12, 1998

[51] Int. Cl.$^6$ .................................................. B23K 9/00
[52] U.S. Cl. ................................ 219/121.57; 219/121.54
[58] Field of Search ........................... 219/121.57, 130.4, 219/121.54, 130.5; 361/256

[56] References Cited

U.S. PATENT DOCUMENTS

| | | | |
|---|---|---|---|
| 3,688,180 | 8/1972 | Chiasson et al. | 321/21 |
| 3,774,007 | 11/1973 | Chiasson et al. | 219/131 R |
| 4,061,899 | 12/1977 | Gillitzer et al. | 219/130.5 |
| 4,092,517 | 5/1978 | Woodacre | 219/137 PS |
| 4,109,130 | 8/1978 | Oku | 219/130.21 |
| 4,225,769 | 9/1980 | Wilkins | 219/130.4 |
| 4,247,752 | 1/1981 | Stringer | 219/130.33 |
| 4,282,569 | 8/1981 | Hardwick et al. | 363/87 |
| 4,283,618 | 8/1981 | Jakob | 219/130.5 |
| 4,560,857 | 12/1985 | Segawa et al. | 219/130.21 |
| 4,628,180 | 12/1986 | Edberg | 219/124.01 |
| 4,665,299 | 5/1987 | Iwata | 219/130.21 |
| 4,929,811 | 5/1990 | Blankenship | 219/121.54 |
| 4,973,821 | 11/1990 | Martin | 219/130.51 |
| 5,036,176 | 7/1991 | Yamaguchi et al. | 219/121.44 |
| 5,166,494 | 11/1992 | Luo et al. | 219/121.55 |
| 5,170,030 | 12/1992 | Solley et al. | 219/121.54 |
| 5,183,990 | 2/1993 | Enyedy | 219/121.54 |
| 5,212,364 | 5/1993 | Chen | 219/137 PS |
| 5,235,162 | 8/1993 | Nourbakhsh | 219/121.54 |
| 5,349,605 | 9/1994 | Campbell | 373/25 |
| 5,365,035 | 11/1994 | Poulsen et al. | 219/137 PS |
| 5,416,297 | 5/1995 | Luo et al. | 219/121.57 |
| 5,424,507 | 6/1995 | Yamaguchi | 219/121.44 |
| 5,486,679 | 1/1996 | Hamura et al. | 219/130.5 |
| 5,506,384 | 4/1996 | Yamaguchi | 219/121.57 |
| 5,506,387 | 4/1996 | Sawada et al. | 219/137 PS |
| 5,530,220 | 6/1996 | Tatham | 219/121.57 |
| 5,548,097 | 8/1996 | Couch, Jr. et al. | 219/121.57 |
| 5,620,617 | 4/1997 | Borowy et al. | 219/121.54 |
| 5,630,952 | 5/1997 | Karino et al. | 217/121.57 |
| 5,643,475 | 7/1997 | Karino et al. | 219/121.57 |
| 5,660,745 | 8/1997 | Naor | 219/121.57 |
| 5,844,197 | 12/1998 | Daniel | 219/121.57 |

*Primary Examiner*—Teresa Walberg
*Assistant Examiner*—Quang Van
*Attorney, Agent, or Firm*—Senniger, Powers, Leavitt & Roedel

[57] ABSTRACT

A pilot arc circuit for a plasma torch establishes a pilot arc current in the channel between the torch electrode and torch tip at a first target level which is greater than a predetermined minimum current sufficient to maintain a stable pilot arc. After a period of time following pilot arc initiation, the pilot arc current is reduced to a second target level which is greater than or equal to the predetermined minimum current so that damage to the torch is reduced by minimizing wear on the parts. The pilot arc current is established and maintained as a function of a pilot arc reference signal. Pulsing the pilot arc current assists in main arc transfer and enhances pilot arc stability.

28 Claims, 5 Drawing Sheets

— ACTUAL PILOT CURRENT
--- IDEAL PILOT CURRENT
····· PILOT REFERENCE SIGNAL
— PILOT ARC VOLTS

— ACTUAL PILOT CURRENT
--- IDEAL PILOT CURRENT
····· PILOT REFERENCE SIGNAL
— PILOT ARC VOLTS
—·— PILOT ENABLE

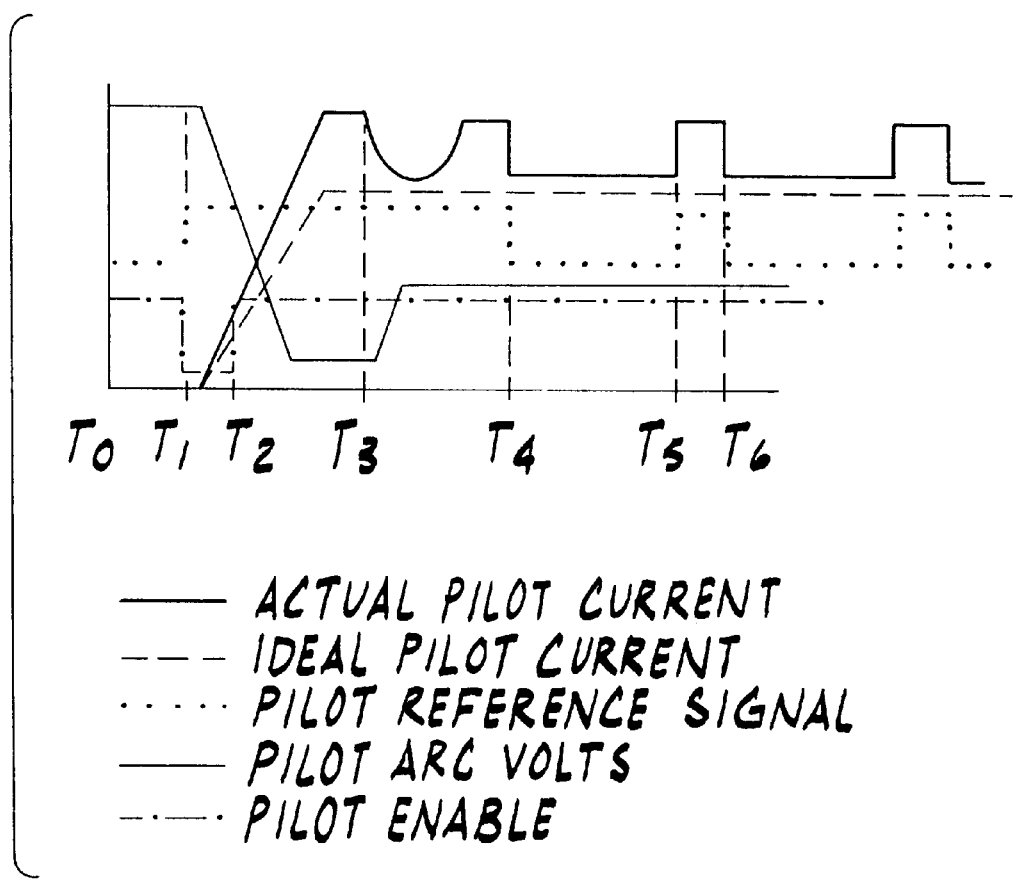

PLASMA TORCH PILOT ARC CIRCUIT

BACKGROUND OF THE INVENTION

The present invention relates generally to plasma torches and, in particular, to a pilot arc circuit which provides improved pilot arc stability and reduced parts wear.

Plasma torches, also known as electric arc torches, are commonly used for cutting and welding metal workpieces by directing a plasma consisting of ionized gas particles toward the workpiece. A typical plasma torch has a torch tip spaced apart from and surrounding an electrode to define a channel or gap into which a plasma gas is supplied.

As is well known in the art, a pilot arc is initiated inside the torch head by applying a sufficiently high voltage across the channel when a stream of gas is flowing therethrough in the direction of an orifice in the torch tip. The torch tip constitutes a relatively positive potential anode, and the electrode, which has a relatively negative potential, operates as a cathode. The high voltage causes a spark to jump the gap between the electrode and the torch tip, thereby creating an electrically charged low impedance path in the plasma gas stream. Thus, the spark heats the gas, causes it to ionize and establishes a pilot arc current between the electrode and the inner surface of the torch tip.

The high voltage which initiates the spark may be generated by either a DC pulse (e.g., capacitive discharge circuits), an AC pulse (e.g., spark gap circuits) or a steady state DC supply, as disclosed in U.S. Pat. No. 5,235,162 to Nourbakhsh. Alternatively, the high voltage spark circuit may be eliminated in favor of a contact start method wherein the electrode and torch tip are brought in contact to initiate current flow and then separated to create the pilot arc.

The pilot arc may also be characterized by the nature and duration of the pilot arc current as follows: (1) a steady DC current of approximately constant level; (2) a DC current pulsing between a higher "pulse" level and a lower "background" level of longer duration; (3) a "blown out pilot" wherein a cycle of initiating the pilot arc for a short duration, extinguishing it and immediately reinitiating it for another short duration is repeated until the cutting arc is established or the start signal is removed; and (4) a single pulse similar to the "blown out pilot" except it does not repeat until the start signal is reapplied. U.S. Pat. No. 5,416,297 to Luo et al. is directed to this latter type of pilot arc, which is generally limited to mechanized cutting applications. Some plasma torch systems limit the duration of the pilot arc by shutting it off after a predetermined time if the cutting arc has not been established.

Once the pilot arc is established between the electrode and the inner surface of the torch tip, the force of the plasma gas flowing through the channel moves the pilot arc toward the tip orifice until it extends from the electrode to the outer surface of the torch tip through the orifice. As soon as the pilot arc has been blown through the tip orifice, the torch is ready to perform a cutting or welding operation. Since the impedance of the workpiece to ground is lower than the impedance of the torch tip to ground, the pilot arc will transfer from the torch tip to the workpiece when the torch is brought sufficiently close to the workpiece. Accordingly, the pilot arc jumps or transfers from the tip to the workpiece so that the workpiece becomes the anode, and the "transferred arc" performs the cutting or welding operation. The transferred arc, which is also commonly referred to as the "main" or "cutting" arc, generally continues until the start signal is removed or the torch is moved away from the workpiece.

Conventional plasma torches include circuitry for controlling the operation of the torch. Examples of such circuitry are disclosed in U.S. Pat. Nos. 5,170,030 to Solley et al. and 5,530,220 to Tatham, both of which are assigned to the assignee of the present invention and specifically incorporated herein by reference. Typically, the torch circuitry will include a pilot arc circuit in which the electrode and tip are coupled with a power source and a main arc circuit in which the electrode, tip and workpiece are coupled with a power source. The pilot arc circuit is usually disconnected upon establishment of the main arc. Sometimes, the same power source is used for both the pilot arc circuit and the main arc circuit. For example, U.S. Pat. No. 5,530,220 discloses a current regulated power circuit which supplies power for pilot arc initiation, pilot arc transfer and arc maintenance during operation on the workpiece.

There are a number of well-known problems and challenges associated with pilot arc initiation and transfer in plasma torches. One such problem is maintaining the pilot arc current at a level sufficient to initiate and maintain a stable pilot arc without causing excessive damage to the tip and electrode. Because the load voltage changes rapidly from about 10–40 volts (when the pilot arc is formed inside the torch head) to about 100–200 volts (after the pilot arc has been blown through the tip orifice), the current regulator cannot keep up and the pilot arc current level therefore droops to some extent below its peak level. If the pilot arc current droops below a minimum current sufficient to maintain the pilot arc, the arc will be unstable, resulting in a sputtering pilot which may go out, which may be discontinuous and/or which may be difficult to transfer. If the pilot arc goes out, the arc must be reinitiated which causes further damage to the torch. On the other hand, if the peak level of the pilot arc current is too high, the torch will sustain unnecessary damage since the wear on the tip and electrode increases as the level of the pilot arc current increases. Existing plasma torches that maintain the pilot arc current at a level high enough to avoid a noncontinuous or "sputtering" pilot arc suffer from excessive parts wear as a result of their relatively high average pilot arc current.

SUMMARY OF THE INVENTION

The present invention, which is directed to the time frame following the high voltage spark and preceding arc transfer, overcomes the prior art problem noted above by providing a pilot arc circuit which establishes and maintains a DC pilot arc current above a minimum current sufficient to maintain a stable, continuous pilot arc and, at the same time, minimizes parts wear by reducing the average pilot arc current.

Accordingly, it is an object of the present invention to provide a plasma torch apparatus adapted to establish and maintain a pilot arc current at a level sufficient to obtain a continuous, stable pilot arc. A related object of the present invention is to provide a plasma torch apparatus adapted to maintain the pilot arc current at a level that minimizes damage to the torch.

It is another object of the present invention to provide circuitry for a plasma torch that establishes a pilot arc current at a first target level sufficient to initiate the pilot arc and maintains the pilot arc current at a second target level sufficient to maintain a stable pilot arc prior to arc transfer.

It is a further object of the present invention to provide circuitry for a plasma torch that substantially reduces the average pilot arc current when compared to prior art torches.

It is still another object of the present invention to provide a pilot reference signal so that the plasma torch circuitry supplies power to establish and maintain the pilot arc as a function of the pilot reference signal.

It is yet another object of the present invention to provide circuitry for a plasma torch which includes a pulsing circuit so that the pilot reference signal includes an initiation pulse and one or more maintenance pulses.

It is still a further object of the present invention to provide a method for establishing and maintaining a pilot arc current at a level sufficient to obtain a continuous, stable pilot arc while minimizing wear to the torch consumable parts.

To accomplish the foregoing objects and other objects which will become apparent to those skilled in the art from the following detailed description of the invention, a plasma torch apparatus is provided which includes a tip, an electrode spaced from the tip to define a channel across which a pilot arc is formed and a current regulated power circuit adapted to supply power to the channel such that a pilot arc current is established at a first target level which is greater than a predetermined minimum current, the power circuit being further adapted to supply power to the channel following pilot arc initiation such that the pilot arc current is maintained at a second target level which is greater than or equal to the predetermined minimum current but usually lower than the first target level. In another aspect, the present invention provides a method for establishing and maintaining a pilot arc by supplying power to the tip and electrode as a function of a pilot initiation reference signal during a pilot initiation phase and supplying power to the tip and electrode as a function of a pilot maintenance reference signal during a pilot maintenance phase.

BRIEF DESCRIPTION OF THE DRAWINGS

So that the manner in which the above-recited features, advantages and objects of the present invention are attained and can be understood in detail, a more particular description of the invention, briefly summarized above, may be had by reference to the embodiments thereof which are illustrated in the appended drawings.

It is noted, however, that the appended drawings illustrate only exemplary embodiments of this invention and are therefore not to be considered limiting of its scope, for the invention may admit to other equally effective embodiments. Reference the appended drawings, wherein:

FIG. 3 is a diagram illustrating the relative levels of pilot arc current and voltage over time in accordance with a preferred embodiment of the present invention wherein the pilot arc current is a pulsed DC current;

DESCRIPTION OF THE PREFERRED EMBODIMENTS

Figure 4A:
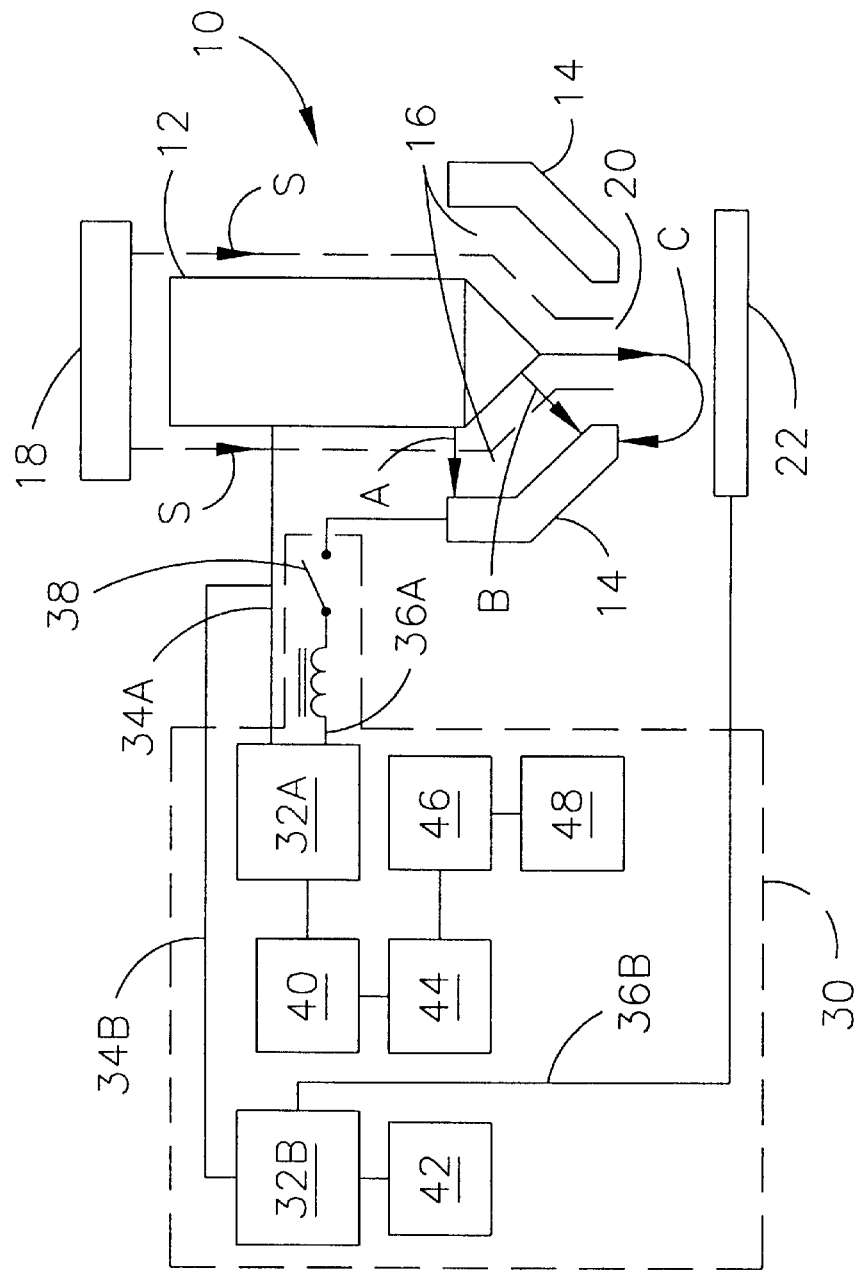
FIG. 4A is a block diagram of a plasma torch apparatus in accordance with a preferred embodiment of the present invention wherein separate power supplies are provided for the pilot arc and the cutting arc.
Figure 4B:
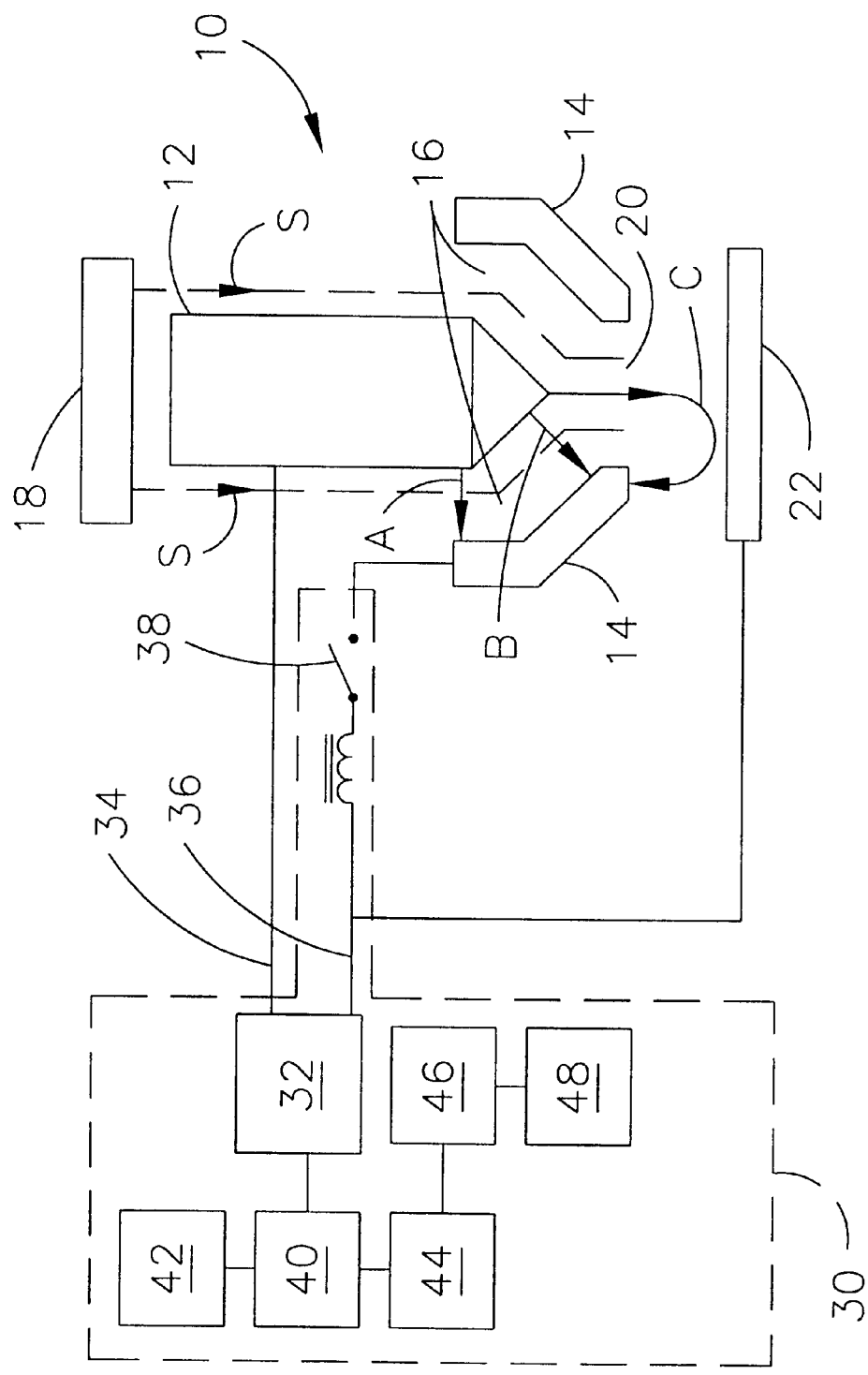
FIG. 4B is a block diagram of a plasma torch apparatus in accordance with a preferred embodiment of the present invention wherein a single power supply is provided for the pilot arc and the cutting arc.

The plasma torch apparatus of the present invention is shown in FIGS. 4A and 4B and includes a torch head designated generally by reference numeral 10. Torch 10 comprises an electrode 12 and an annular torch tip 14 spaced apart from the electrode to define a channel 16 across which the pilot arc is formed. The torch is coupled with a gas supply 18 for providing a stream of plasma gas through channel 16. The gas stream exits the channel through an orifice 20 in tip 14, and the tip is moved in close proximity to a workpiece 22 just prior to commencing cutting or welding operations. The presently preferred embodiment of the invention is a commercially-available plasma torch system, model number 100XL, which is sold by Thermal Dynamics Corporation of West Lebanon, N.H.

The torch apparatus also includes circuitry 30. While FIG. 4A shows an interconnection of circuit elements whereby separate power supplies are provided for the pilot arc and cutting arc, FIG. 4B depicts a configuration of circuit elements whereby a common power supply is used for the pilot arc and cutting arc.

Referring initially to FIG. 4B, a DC power supply 32 has a negative terminal 34 coupled with electrode 12 and a positive terminal 36 coupled with the tip 14 and the workpiece 22. An optional pilot disconnect switch 38 is disposed between terminal 36 and tip 14. A regulator circuit 40 is coupled with power supply 32 for regulating the power supplied to the torch. Since there is not a separate cutting arc power supply in this embodiment, a cutting reference signal generator 42 is coupled to the regulator circuit. The power supply, disconnect switch, regulator circuit and cutting reference signal generator are all conventional.

Figure 5:
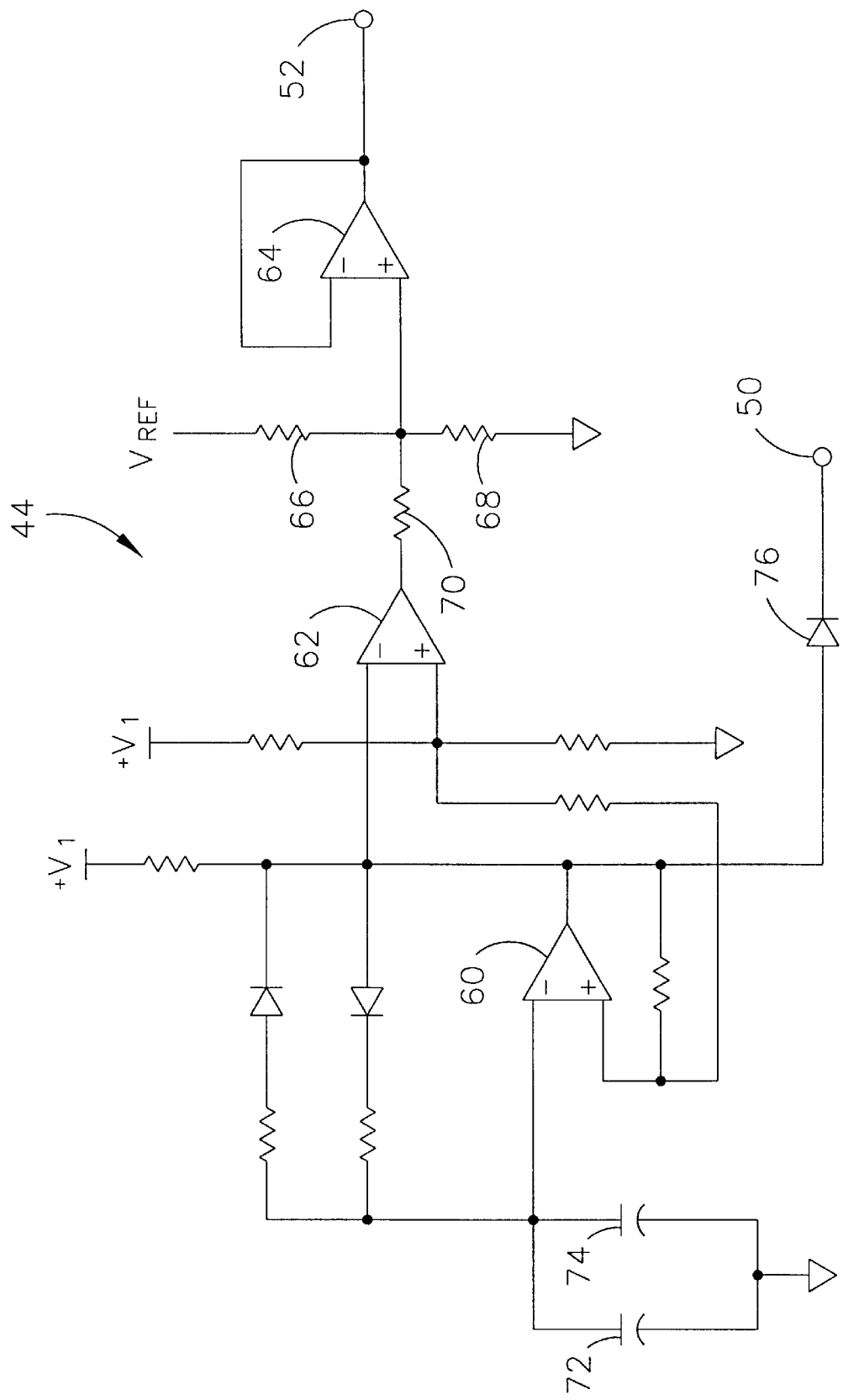
FIG. 5 is a circuit diagram of a pilot reference signal generator in accordance with a preferred embodiment of the present invention.

A pilot reference signal generator 44, which is described below in connection with FIG. 5, is also coupled to the regulator circuit 40. In a preferred embodiment of the present invention, a pulsing circuit 46 and a pilot enable circuit 48 are coupled to the pilot reference signal generator 44. However, the pulsing circuit and the pilot enable switch are optional features of the present invention.

Primarily, FIG. 4A differs from FIG. 4B in that in FIG. 4A separate power supplies 32A and 32B are provided for the pilot arc and cutting arc, respectively. Negative terminal 34A of the pilot power supply 32A is coupled with electrode 12, and positive terminal 36A of the pilot power supply 32A is coupled via switch 38 to tip 14. Similarly, negative terminal 34B of the cutting power supply 32B is coupled with electrode 12, and positive terminal 36B of the cutting power supply 32B is coupled with the workpiece 22. Accordingly, cutting reference signal generator 42 connects to cutting power supply 32B and optional switch 38, if used, remains connected between pilot power supply 32A and tip 14.

FIG. 5 is a circuit diagram of a preferred embodiment of the pilot reference signal generator 44 shown in FIGS. 4A and 4B. The circuit 44 is activated upon receiving a pilot enable or start signal at input 50, which is connected to pilot enable switch 38. The output 52 of circuit 44 is connected to regulator circuit 40 so that the pilot reference signal is provided to circuit 40.

The signal generator circuit shown in FIG. 5 includes comparators 60, 62 which form a pulser oscillator and produce a pulser output at comparator 62. The pulser output is an open collector circuit, so it is either pulled to ground or an open connection. The pilot reference signal is set by the voltage at the positive input to operational amplifier 64. When the pulser output is an open circuit, the higher "pulse"

level of the pilot reference signal is determined by the voltage divider comprising resistors 66, 68. When the pulser output is low, a resistor 70 is connected in parallel with resistor 68, which lowers the effective value of resistor 68 and sets the lower "background" level. In a preferred embodiment, the reference signal pulse level is 4.8 volts, and the reference signal background level is 2.4 volts. The circuit 44 also includes capacitors 72, 74 and diode 76, which are described in more detail below.

Figure 1:
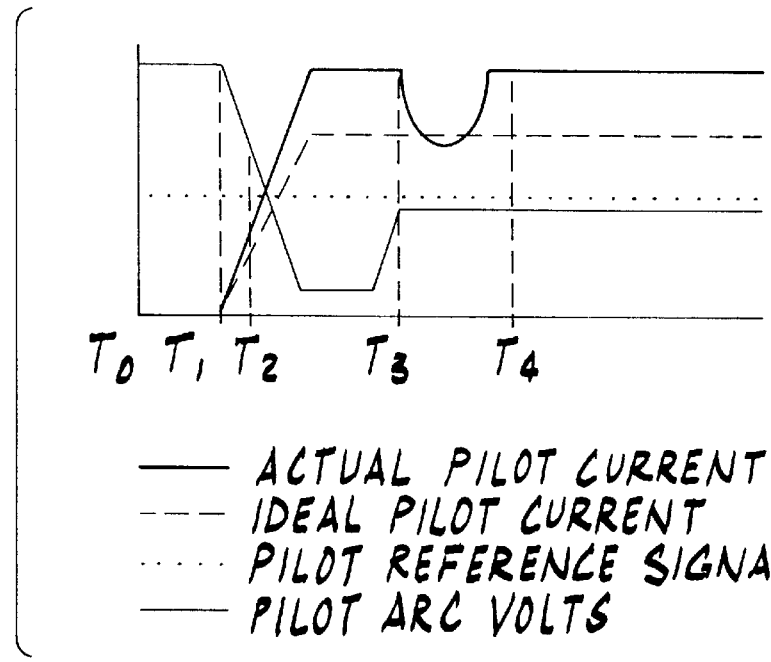
FIG. 1 is a diagram illustrating the relative levels of pilot arc current and voltage over time in a prior art plasma torch system.

As mentioned above, existing plasma torches have not been able to adequately maintain the pilot arc current at a level high enough to avoid a non-continuous or "sputtering" pilot arc yet low enough to avoid excessive parts wear. FIG. 1 indicates the relative levels of pilot arc current and voltage over time in a conventional plasma torch wherein a steady DC current of approximately constant level is supplied to the pilot arc as a function of a pilot reference signal which may be constant or variable and adjustable. At time instant T1, the pilot arc voltage begins to drop and the pilot current begins to rise. Eventually, the pilot current rises to its desired level (between T2 and T3), which is above the ideal pilot current below which sputtering will occur. The ideal pilot current represents a predetermined minimum current sufficient to maintain a stable pilot arc. At time instant T3, the pilot arc begins to exit the orifice and the pilot current begins to droop as the current regulator circuit tries to keep up with the dynamic changes in load voltage. If the pilot current droops below the ideal pilot current (as shown between T3 and T4), the pilot arc will sputter and may even go out. Provided the pilot arc does not go out, the pilot current will return to its peak level at T4 when the regulator circuit finally catches up with the change in load voltage.

Although FIG. 1 is not directed to torch systems having a pulsed DC pilot current, those prior art systems also fail to provide a continuous, stable pilot arc while minimizing parts wear. In fact, pulsed prior art systems provide randomly generated pulses which frequently cause the initial value of the pilot arc current to be established as a function of the lower background level of the reference signal. The present invention overcomes this problem by synchronizing the pulsing circuit 46 with the pilot reference signal generator 44 so that the reference signal is always initially set at the higher peak level rather than the lower background level.

Figure 2:
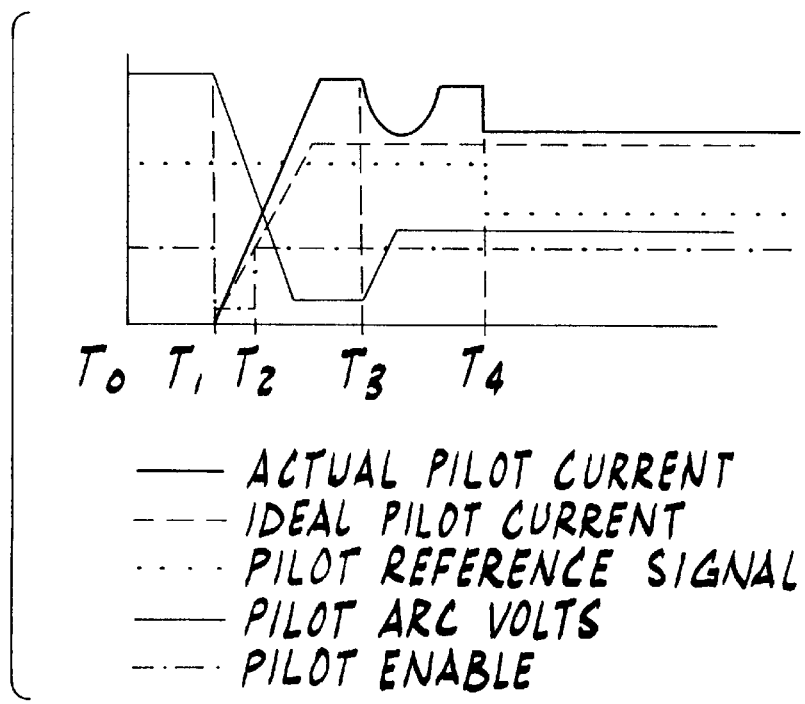
FIG. 2 is a diagram illustrating the relative levels of pilot arc current and voltage over time in accordance with a preferred embodiment of the present invention wherein the pilot arc current is a steady DC current.

In contrast to FIG. 1, FIGS. 2 and 3 show the relative levels of pilot arc current and voltage over time in accordance with the present invention. In FIG. 2, a start signal brings the pilot enable low (an active low signal) at T1 until a pilot arc current is sensed at T2 and the pilot enable is brought high again. The pilot reference signal is initially set at a higher initiation level, and, given that power is supplied to the torch head as a function of the pilot reference signal, the pilot arc current is likewise established at a higher pilot initiation level. Then, at T4, the reference signal is reduced to a maintenance level, and the pilot arc current drops to the lower pilot maintenance level at the same time. Importantly, the initiation level must be high enough so that the pilot arc current does not droop below the ideal pilot current between T3 and T4 in response to the changing load voltage. However, once the current regulator brings the pilot arc current back up to the initiation level, it is no longer necessary to maintain the pilot arc current substantially above the ideal pilot current. Therefore, the reference signal, which is typically a voltage, is reduced after a predetermined period of time following pilot arc initiation so that the pilot arc current is maintained at or slightly above the ideal pilot current until arc transfer occurs. The time T1–T4 will vary somewhat from torch to torch, but is generally within the range of 10 to 200 milliseconds and preferably between 30 and 40 milliseconds. Promptly reducing the pilot arc current to the maintenance level minimizes the average pilot arc current and therefore minimizes damage to the torch.

FIG. 3 is essentially identical to FIG. 2, except that the pilot reference signal and pilot arc current are pulsed between two different levels. As with FIG. 2, the reference signal is reduced at T4 from the initiation level, which compensates for the anticipated droop in pilot arc current, to the maintenance level. In FIG. 3, however, the reference signal and the pilot arc current are pulsed at T5–T6 periodically following pilot arc initiation. It is presently preferred to pulse the pilot arc current periodically because such pulsing has been found to assist in main arc transfer and to enhance the stability of the arc without materially increasing damage to the torch from parts wear. FIGS. 1–3 are not necessarily to scale and are provided simply to illustrate the sequence of relative changes to pilot arc current and voltage over time.

In operation, the plasma torch apparatus is actuated and gas flow through the channel 16 begins upon receiving a start signal from the pilot enable circuit 48. The pilot arc is then initiated at location A (FIGS. 4A and 4B), preferably by means of a conventional high voltage spark between the tip and the electrode which ionizes the gas in the channel to create a low impedance path for the lower voltage (typically 10–40 volts) and higher current (typically 10–30 amps) pilot arc. The length of a typical pilot arc within the channel at location A or B is approximately 0.1 inches. The pilot arc remains at location A only momentarily before the stream of plasma gas moves it along the channel to location B and through the tip orifice 20 so that it extends between the electrode 12 and the outer surface of torch tip 14. When the pilot arc is extending through the orifice at location C, it is typically between 0.5 and 1.0 inches in length.

With reference to FIG. 5, the start signal from an operator causes the pilot enable input 50 to go low, which causes diode 76 to pull low, thereby allowing capacitors 72, 74 to completely discharge to zero volts. This causes the pulser output to be held at open circuit, thus setting the pilot reference signal to the higher pulse level. When pilot arc initiation is sensed (e.g., by conventional current or voltage sensing means), the pilot enable is brought high, and capacitors 72, 74 start charging from zero volts toward +V1. Until the capacitor charge reaches a certain threshold level, the pulser output remains unchanged with the reference signal at the higher pulse level. Since the capacitors 72, 74 are initially starting at zero charge, the duration of the first pulse will be longer than the subsequent pulses. It has been found that an extended first pulse advantageously compensates for the anticipated pilot arc current droop. Once the capacitor charge reaches the threshold level, the pulser output goes low, the pilot reference signal is set to the lower background level and the capacitors 72, 74 start discharging. When the capacitors have substantially discharged, the cycle starts over again and the thus capacitors 72, 74 form an oscillator.

FIG. 5 represents only one of many different circuits contemplated for accomplishing the objects of the present invention. A non-pulsing version of FIG. 5, for example, would simply require that the pulser oscillator be configured as a "one shot" so that it would provide a single pulse but would not oscillate. Consequently, after the single pulse, the pilot reference signal would remain at the lower background level. Those skilled in the art will readily appreciate any number of other such modifications that could be made to the torch circuitry.

As various changes could be made in the above constructions and circuits without departing from the scope of the invention, it is intended that all matter contained in the above description and shown in the accompanying drawings shall be interpreted as illustrative and not in a limiting sense.

What is claimed is:

1. A plasma torch apparatus in which a pilot arc is formed prior to operating on a workpiece, said plasma torch comprising:

a tip presenting an orifice;

an electrode spaced from the tip to define a channel across which the pilot arc is formed; and a current regulated power circuit coupled with the tip and the electrode and adapted to supply power to the channel during a pilot initiation phase such that a pilot arc current is established between the electrode and the tip at a first target level which is greater than a predetermined minimum current level sufficient to maintain the pilot arc so that the pilot arc current will remain at or above the predetermined minimum current level throughout the initiation phase;

said current regulated power circuit being further adapted to supply power to the channel during a pilot maintenance phase such that the pilot arc current is maintained substantially at a second target level which is greater than or equal to the predetermined minimum current level so that the pilot arc current will remain at or above the predetermined minimum current level throughout the maintenance phase wherein the second target level is different than the first target level.

2. The apparatus of claim 1, wherein the first target level is greater than the second target level and wherein a difference between the first target level and the predetermined minimum current level includes an allowance for a pilot arc current droop during the initiation phase so that the pilot arc current is maintained above the predetermined minimum current level during droop.

3. The apparatus of claim 1, wherein said current regulated power circuit includes a pilot reference signal generator for producing a pilot reference signal set to an initiation level for the initiation phase and reset to a maintenance level for the maintenance phase wherein the maintenance level is less than the initiation level.

4. The apparatus of claim 3, wherein said current regulated power circuit is adapted to regulate the supply of power to the channel as a function of the pilot reference signal.

5. The apparatus of claim 4, wherein said current regulated power circuit is adapted to regulate the pilot arc current at or above the predetermined minimum current level by applying a voltage across the channel as a function of the pilot reference signal.

6. The apparatus of claim 5, wherein the pilot reference signal represents a voltage.

7. The apparatus of claim 6, wherein the pilot reference signal is reset from the initiation level to the maintenance level after a fixed period of time following initiation of the pilot arc current.

8. The apparatus of claim 7, wherein the fixed period of time is within the range from 10 to 200 milliseconds.

9. The apparatus of claim 4, wherein said current regulated power circuit further includes a pulsing circuit coupled with the pilot reference signal generator so that the pilot reference signal comprises an initiation pulse during the initiation phase followed by one or more maintenance pulses during the maintenance phase.

10. The apparatus of claim 9, wherein the initiation pulse is maintained at the initiation level substantially throughout the initiation phase.

11. The apparatus of claim 10, wherein the pilot reference signal is maintained above the maintenance level during the one or more maintenance pulses.

12. The apparatus of claim 11, wherein the pilot reference signal is maintained at the maintenance level throughout the maintenance phase except during the one or more maintenance pulses.

13. The apparatus of claim 9, wherein a duration of the initiation pulse is greater than the duration of the one or more maintenance pulses.

14. The apparatus of claim 13, wherein a duty cycle of the one or more maintenance pulses is less than fifty percent.

15. The apparatus of claim 1, wherein said current regulated power circuit is also coupled with the workpiece.

16. The apparatus of claim 1, wherein a stream of plasma gas passes through the channel toward the tip orifice during the initiation phase.

17. A method for establishing and maintaining a pilot arc in a plasma torch having an electrode and a tip spaced apart from one another to define a channel across which the pilot arc is formed, said method comprising:

providing a current regulated power circuit for regulating power to the electrode and the tip to establish and maintain the pilot arc;

providing a pilot initiation reference signal to the current regulated power circuit during a pilot initiation phase;

supplying power to the electrode and the tip as a function of the pilot initiation reference signal such that a pilot arc current is established between the electrode and the tip at a first target level which is greater than a predetermined minimum current level sufficient to maintain the pilot arc so that the pilot arc current remains at or above the predetermined minimum current level throughout the initiation phase;

providing a pilot maintenance reference signal to the current regulated power circuit during a pilot maintenance phase; and supplying power to the electrode and the tip as a function of the pilot maintenance reference signal such that the pilot arc current is maintained at a second target level which is at or above the predetermined minimum current level so that the pilot arc current will remain at or above the predetermined minimum current level throughout the maintenance phase wherein the second target level is different than the first target level.

18. The method of claim 17, further comprising providing a stream of plasma gas which passes through the channel in a direction of an orifice in the tip during the initiation phase.

19. The method of claim 18, further comprising moving the pilot arc through the channel in the direction of the tip orifice until the pilot arc extends from the electrode to the tip through the tip orifice.

20. The method of claim 17, wherein each of said supplying steps further comprises applying a voltage across the channel as a function of the reference signal.

21. In a torch having a tip and an electrode spaced from the tip to define a channel across which a pilot arc is formed, the improvement comprising:

a current regulated power circuit coupled with the tip and the electrode and adapted to supply power to the channel during a pilot initiation phase such that a pilot arc current is established between the electrode and the tip at a first target level which is greater than a predetermined minimum current level sufficient to maintain the pilot arc so that the pilot arc current will remain at or above the predetermined minimum current level throughout the initiation phase;

said current regulated power circuit being further adapted to supply power to the channel during a pilot maintenance phase such that the pilot arc current is substantially maintained at a second target level which is greater than or equal to the predetermined minimum current level so that the pilot arc current will remain at or above the predetermined minimum current level throughout the maintenance phase wherein the second target level is different than the first target level.

22. The circuit of claim 21, wherein said current regulated power circuit includes a pilot reference signal generator for producing a pilot reference signal set to an initiation level for the initiation phase and reset to a maintenance level for the maintenance phase, said power circuit being adapted to regulate the supply of power to the channel as a function of the pilot reference signal.

23. The circuit of claim 22, wherein said pilot reference signal generator includes a timer circuit for generating a signal indicating the end of the initiation phase and the beginning of the maintenance phase.

24. The circuit of claim 22, wherein said pilot reference signal generator is enabled upon actuation of a pilot enable circuit coupled with the signal generator.

25. The circuit of claim 22, wherein said current regulated power circuit further includes a regulator circuit coupled with at least one power supply.

26. The circuit of claim 22, wherein said current regulated power circuit further includes a pulsing circuit coupled with the pilot reference signal generator so that the pilot reference signal comprises an initiation pulse during the initiation phase followed by one or more maintenance pulses during the maintenance phase.

27. The circuit of claim 26, wherein the pilot reference signal generator includes means for extending the duration of the initiation pulse so that the duration of the initiation pulse is greater than the duration of any of the one or more maintenance pulses.

28. The circuit of claim 27, wherein said means for extending includes a diode coupled with an oscillator.

* * * * *